US012798462B2

(12) United States Patent
Hirao

(10) Patent No.: US 12,798,462 B2
(45) Date of Patent: Nov. 17, 2026

(54) SEAT FOR MOVING DEVICE, SEAT CONTROL DEVICE, AND SEAT CONTROL METHOD

(71) Applicant: SONY GROUP CORPORATION, Tokyo (JP)

(72) Inventor: Toshihiro Hirao, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 362 days.

(21) Appl. No.: 17/759,381

(22) PCT Filed: Jan. 15, 2021

(86) PCT No.: PCT/JP2021/001160
§ 371 (c)(1),
(2) Date: Jul. 25, 2022

(87) PCT Pub. No.: WO2021/153262
PCT Pub. Date: Aug. 5, 2021

(65) Prior Publication Data

US 2023/0077600 A1 Mar. 16, 2023

(30) Foreign Application Priority Data

Jan. 30, 2020 (JP) ................................ 2020-013884

(51) Int. Cl.
*B60N 2/90* (2018.01)
*A47C 7/14* (2006.01)
(Continued)

(52) U.S. Cl.
CPC ................ *B60N 2/914* (2018.02); *A47C 7/14* (2013.01); *B60N 2/0025* (2023.08);
(Continued)

(58) Field of Classification Search
CPC .......... B60N 2/914; B60N 2/62; B60N 2/665; B60N 2/0279
See application file for complete search history.

(56) References Cited

U.S. PATENT DOCUMENTS 4,969,684 A * 11/1990 Zarotti ................ A47C 27/082 297/284.3
6,056,079 A * 5/2000 Cech ................ B60R 21/01516 177/144

(Continued)

FOREIGN PATENT DOCUMENTS

DE 102013220551 A1 4/2015
JP H05026492 4/1993

(Continued)

OTHER PUBLICATIONS

International Search Report and Written Opinion of PCT Application No. PCT/JP2021/001160, issued on Mar. 30, 2021, 17 pages of ISRWO.

*Primary Examiner* — Syed A Islam
(74) *Attorney, Agent, or Firm* — CHIP LAW GROUP

(57) ABSTRACT

The present technology relates to a seat for a moving device, a seat control device, and a seat control method capable of improving comfort of a seat with a simple configuration. A seat for a moving device includes a left adjustment portion configured to adjust hardness of a left gluteal contact portion including a portion assumed to be in contact with a left gluteal portion of a user on a seat surface and a right adjustment portion configured to adjust hardness of a right gluteal contact portion including a portion assumed to be in contact with a right gluteal portion of the user on the seat surface. The present technology can be applied to, for example, a system that controls automatic driving.

18 Claims, 7 Drawing Sheets

(51) Int. Cl.
*B60N 2/00* (2006.01)
*B60N 2/02* (2006.01)

(52) U.S. Cl.
CPC ....... *B60N 2/02246* (2023.08); *B60N 2/0273* (2023.08); *B60N 2230/20* (2023.08)

(56) References Cited

U.S. PATENT DOCUMENTS

| | | | | | |
|---|---|---|---|---|---|
| 6,088,642 | A * | 7/2000 | Finkelstein | B60N 2/0228 | 701/49 |
| 7,152,920 | B2 * | 12/2006 | Sugiyama | B60N 2/914 | 297/284.6 |
| 10,899,251 | B2 * | 1/2021 | Dry | B60N 2/1665 | |
| 11,667,222 | B1 * | 6/2023 | Larner | B60N 2/502 | 701/49 |
| 2018/0178698 | A1 | 6/2018 | Izukawa | | |
| 2019/0084447 | A1 * | 3/2019 | Lee | B60N 2/14 | |
| 2019/0351787 | A1 * | 11/2019 | Lodhia | B60N 2/0244 | |
| 2020/0238854 | A1 * | 7/2020 | Gandhi | B60N 2/914 | |

FOREIGN PATENT DOCUMENTS

| | | | |
|---|---|---|---|
| JP | 06-077592 | U | 11/1994 |
| JP | 2009-119230 | A | 6/2009 |
| JP | 2017-132364 | A | 8/2017 |
| JP | 2018-095015 | A | 6/2018 |
| JP | 2018-103850 | A | 7/2018 |
| JP | 2018-165135 | A | 10/2018 |
| JP | 2019-209933 | A | 12/2019 |
| WO | 2019/116685 | A1 | 6/2019 |

* cited by examiner

SEAT FOR MOVING DEVICE, SEAT CONTROL DEVICE, AND SEAT CONTROL METHOD

CROSS REFERENCE TO RELATED APPLICATIONS

This application is a U.S. National Phase of International Patent Application No. PCT/JP2021/001160 filed on Jan. 15, 2021, which claims priority benefit of Japanese Patent Application No. JP 2020-013884 filed in the Japan Patent Office on Jan. 30, 2020. Each of the above-referenced applications is hereby incorporated herein by reference in its entirety.

TECHNICAL FIELD

The present technology relates to a seat for a moving device, a seat control device, and a seat control method, and particularly relates to a seat for a moving device, a seat control device, and a seat control method for improving comfort.

BACKGROUND ART

Conventionally, vehicle seats capable of adjusting hardness according to a user's body shape and posture have been proposed.

For example, a technique in which 15 air cells are provided in a seat cushion and a seat back, a physique of a user is determined on the basis of an output signal from a capacitance sensor provided in each air cell, and the air cells are filled with air and emptied to adjust a seat shape and hardness according to the physique has been proposed (see, for example, Patent Document 1).

For example, a technique in which a plurality of pressure sensors is provided on a support surface of a pad member of a seat cushion, a plurality of linear actuators is arranged in a front-rear direction, and each actuator is controlled according to a pressure distribution of the seat cushion to adjust hardness of a desired region has proposed (see, for example, Patent Document 2).

CITATION LIST

Patent Document

Patent Document 1: Japanese Patent Application Laid-Open No. 2009-119230

Patent Document 2: Japanese Patent Application Laid-Open No. 2018-165135

SUMMARY OF THE INVENTION

Problems to be Solved by the Invention

However, the seats described in Patent Documents 1 and 2 require a large number of air cells, actuators, sensors, and the like. Therefore, the number of parts increases, the configuration and the manufacturing process become complicated, and the cost of the seat increases.

The present technology has been made in view of such a situation, and aims to improve the comfort of the seat with a simple configuration.

Solutions to Problems

A seat for a moving device according to a first aspect of the present technology includes a first adjustment portion configured to adjust hardness of a left gluteal contact portion including a portion assumed to be in contact with a left gluteal portion of a user on a seat surface and a second adjustment portion configured to adjust hardness of a right gluteal contact portion including a portion assumed to be in contact with a right gluteal portion of the user on the seat surface.

A seat control device according to a second aspect of the present technology includes a seat control unit configured to individually control hardness of a left gluteal contact portion including a portion assumed to be in contact with a left gluteal portion of a user and hardness of a right gluteal contact portion including a portion assumed to be in contact with a right gluteal portion of the user on a seat surface of a seat for the moving device on the basis of at least one of a state of the user, a state of the moving device, a situation in the moving device, and a situation outside the moving device.

A seat control method according to the second aspect of the present technology includes individually controlling hardness of a left gluteal contact portion including a portion assumed to be in contact with a left gluteal portion of a user and hardness of a right gluteal contact portion including a portion assumed to be in contact with a right gluteal portion of the user on a seat surface of a seat for the moving device on the basis of at least one of a state of the user, a state of the moving device, a situation in the moving device, and a situation outside the moving device.

In the first aspect of the present technology, hardness of a left gluteal contact portion including a portion assumed to be in contact with a left gluteal portion of a user on a seat surface is adjusted and hardness of a right gluteal contact portion including a portion assumed to be in contact with a right gluteal portion of the user on the seat surface is adjusted.

In the second aspect of the present technology, hardness of a left gluteal contact portion including a portion assumed to be in contact with a left gluteal portion of a user and hardness of a right gluteal contact portion including a portion assumed to be in contact with a right gluteal portion of the user on a seat surface of a seat for the moving device are individually controlled on the basis of at least one of a state of the user, a state of the moving device, a situation in the moving device, and a situation outside the moving device.

MODE FOR CARRYING OUT THE INVENTION

Hereinafter, modes for carrying out the present technology will be described. The description will be given in the following order.

1. Configuration example of vehicle control system
2. Embodiments
3. Modification example
4. Other

1. CONFIGURATION EXAMPLE OF VEHICLE CONTROL SYSTEM

Figure 1:
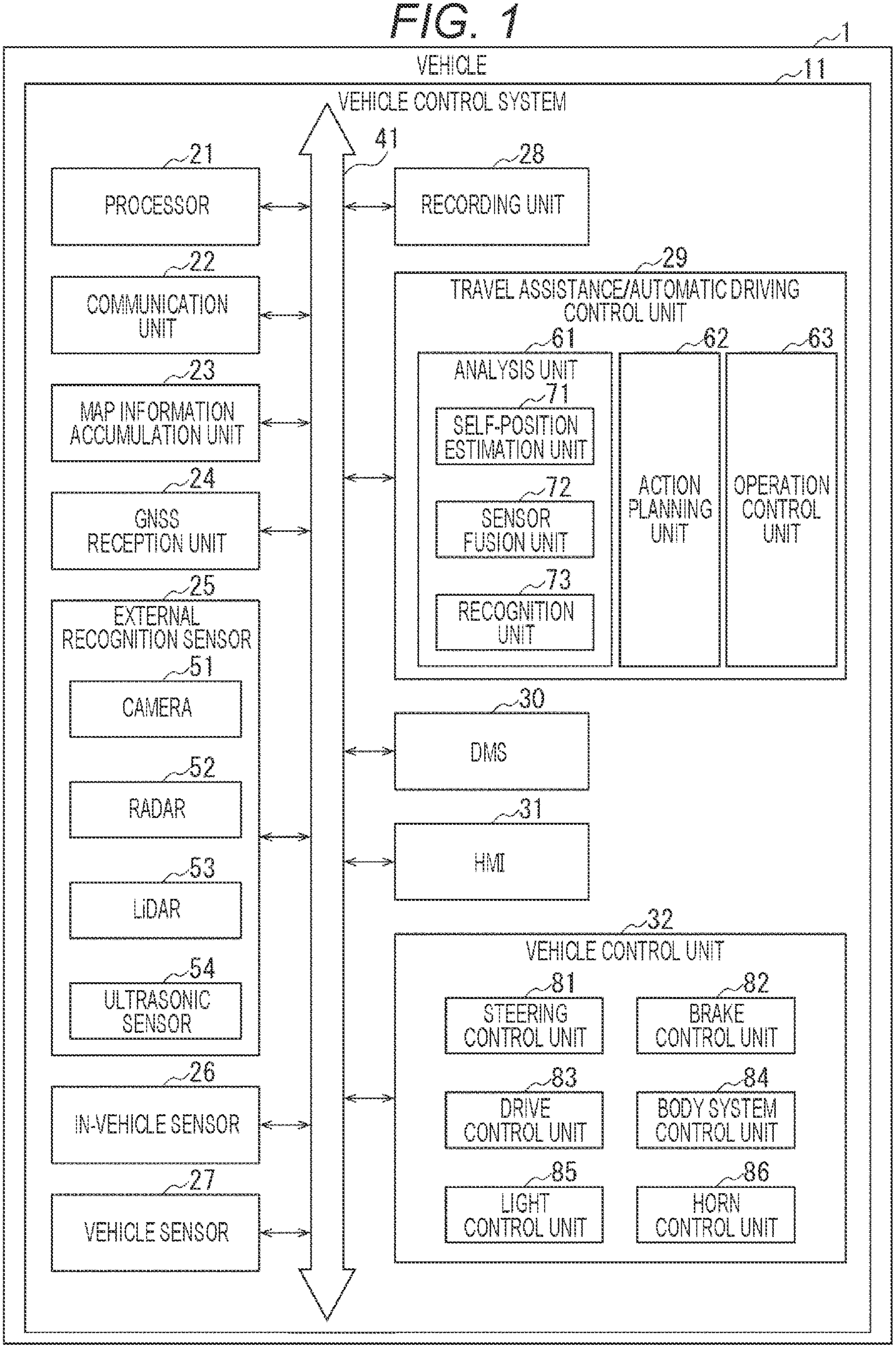
FIG. 1 is a block diagram illustrating a configuration example of a vehicle control system.

FIG. 1 is a block diagram illustrating a configuration example of a vehicle control system 11 which is an example of a moving device control system to which the present technology is applied.

The vehicle control system 11 is provided in the vehicle 1 and performs processing related to travel assistance and automatic driving of the vehicle 1.

The vehicle control system 11 includes a processor 21, a communication unit 22, a map information accumulation unit 23, a global navigation satellite system (GNSS) reception unit 24, an external recognition sensor 25, an in-vehicle sensor 26, a vehicle sensor 27, a recording unit 28, a travel assistance/automatic driving control unit 29, a driver monitoring system (DMS) 30, a human machine interface (HMI) 31, and a vehicle control unit 32.

The processor 21, the communication unit 22, the map information accumulation unit 23, the GNSS reception unit 24, the external recognition sensor 25, the in-vehicle sensor 26, the vehicle sensor 27, the recording unit 28, the travel assistance/automatic driving control unit 29, the driver monitoring system (DMS) 30, the human machine interface (HMI) 31, and the vehicle control unit 32 are connected to one another via a communication network 41. The communication network 41 includes, for example, an in-vehicle communication network, a bus, or the like conforming to an arbitrary standard such as a controller area network (CAN), a local interconnect network (LIN), a local area network (LAN), FlexRay (registered trademark), or Ethernet (registered trademark). Note that each unit of the vehicle control system 11 may be directly connected by, for example, near field communication (NFC), Bluetooth (registered trademark), or the like without passing through the communication network 41.

Note that, hereinafter, in a case where each unit of the vehicle control system 11 performs communication via the communication network 41, description of the communication network 41 will be omitted. For example, in a case where the processor 21 and the communication unit 22 perform communication via the communication network 41, it is simply described that the processor 21 and the communication unit 22 perform communication.

For example, the processor 21 includes various processors such as a central processing unit (CPU), a micro processing unit (MPU), and an electronic control unit (ECU). The processor 21 controls the entire vehicle control system 11.

The communication unit 22 communicates with various devices inside and outside the vehicle, other vehicles, servers, base stations, and the like, and transmits and receives various data. As the communication with the outside of the vehicle, for example, the communication unit 22 receives a program for updating software for controlling the operation of the vehicle control system 11, map information, traffic information, information on the surroundings of the vehicle 1, and the like from the outside. For example, the communication unit 22 transmits information regarding the vehicle 1 (for example, data indicating the state of the vehicle 1, a recognition result by a recognition unit 73, and the like.), information on the surroundings of the vehicle 1, and the like to the outside. For example, the communication unit 22 performs communication corresponding to a vehicle emergency call system such as an eCall.

Note that a communication method of the communication unit 22 is not particularly limited. Furthermore, a plurality of communication methods may be used.

As communication with the inside of the vehicle, for example, the communication unit 22 performs wireless communication with a device in the vehicle by a communication method such as wireless LAN, Bluetooth, NFC, or wireless USB (WUSB). For example, the communication unit 22 performs wired communication with a device in the vehicle by a communication method such as Universal Serial Bus (USB), a High-Definition Multimedia Interface (HDMI), (registered trademark), or Mobile High-definition Link (MHL) via a connection terminal (and if necessary, a cable) that is not illustrated.

Here, the in-vehicle device is, for example, a device that is not connected to the communication network 41 in the vehicle. For example, a mobile device or a wearable device carried by a passenger such as a driver, an information device brought into the vehicle and temporarily installed, or the like is assumed.

For example, the communication unit 22 communicates with a server or the like on an external network (For example, the Internet, a cloud network, or a company-specific network) via a base station or an access point by a wireless communication scheme such as a fourth generation mobile communication system (4G), a fifth generation mobile communication system (5G), Long Term Evolution (LTE), or Dedicated Short Range Communications (DSRC).

For example, the communication unit 22 communicates with a terminal (for example, a terminal of a pedestrian or a store, or a machine type communication (MTC) terminal) in the vicinity of the host vehicle using a peer to peer (P2P) technology. For example, the communication unit 22 performs V2X communication. The V2X communication is, for example, vehicle to vehicle communication with another vehicle, vehicle to infrastructure communication with a roadside device or the like, vehicle to home communication, vehicle to pedestrian communication with a terminal or the like possessed by a pedestrian, or the like.

For example, the communication unit 22 receives electromagnetic waves transmitted by a road traffic information communication system (Vehicle Information and Communication System (VICS; registered trademark)) such as a radio wave beacon, an optical beacon, or FM multiplex broadcasting.

The map information accumulation unit 23 accumulates a map acquired from the outside and a map created by the vehicle 1. For example, the map information accumulation unit 23 accumulates a three-dimensional high-precision map, a global map having lower accuracy than the high-precision map and covering a wide area, and the like.

The high-precision map is, for example, a dynamic map, a point cloud map, a vector map (also referred to as an advanced driver assistance system (ADAS) map.), or the like. The dynamic map is, for example, a map including four layers of dynamic information, semi-dynamic information, semi-static information, and static information, and is provided from an external server or the like. The point cloud map is a map including point clouds (point cloud data). The vector map is a map in which information such as a lane and a position of a signal is associated with the point cloud map. The point cloud map and the vector map may be provided from, for example, an external server or the like, or may be created by the vehicle 1 as a map for performing matching with a local map as will be described later on the basis of a sensing result by a radar 52, a LiDAR 53, or the like, and may be accumulated in the map information accumulation unit 23. Furthermore, in a case where the high-precision map is provided from an external server or the like, for example, map data of several hundred square meters regarding a planned route that the vehicle 1 will travel from a current point in time is acquired from the server or the like in order to reduce the communication capacity.

The GNSS reception unit 24 receives a GNSS signal from a GNSS satellite, and supplies the GNSS signal to the travel assistance/automatic driving control unit 29.

The external recognition sensor 25 includes various sensors used for recognizing a situation outside the vehicle 1, and supplies sensor data from each sensor to each unit of the vehicle control system 11. The types and number of sensors included in the external recognition sensor 25 are arbitrary.

For example, the external recognition sensor 25 includes a camera 51, the radar 52, the light detection and ranging or laser imaging detection and ranging (LiDAR) 53, and an ultrasonic sensor 54. The number of the cameras 51, the radars 52, the LiDAR 53, and the ultrasonic sensors 54 is arbitrary, and an example of the sensing region of each sensor will be described later.

Note that, as the camera 51, for example, a camera of an arbitrary imaging system such as a time of flight (ToF) camera, a stereo camera, a monocular camera, or an infrared camera is used as necessary.

Furthermore, for example, the external recognition sensor 25 includes an environment sensor for detecting weather, climate, brightness, and the like. The environment sensor includes, for example, a raindrop sensor, a fog sensor, a sunshine sensor, a snow sensor, an illuminance sensor, and the like.

Moreover, for example, the external recognition sensor 25 includes a microphone used for detecting a sound around the vehicle 1, a position of a sound source, and the like.

The in-vehicle sensor 26 includes various sensors for detecting information inside the vehicle, and supplies sensor data from each sensor to each unit of the vehicle control system 11. The types and number of sensors included in the in-vehicle sensor 26 are arbitrary.

For example, the in-vehicle sensor 26 includes a camera, a radar, a seating sensor, a steering wheel sensor, a microphone, a biological sensor, and the like. As the camera, for example, a camera of any imaging system such as a ToF camera, a stereo camera, a monocular camera, or an infrared camera can be used. The biological sensor is provided, for example, in a seat, a steering wheel, or the like, and detects various kinds of biological information of an occupant such as a driver.

The vehicle sensor 27 includes various sensors for detecting the state of the vehicle 1, and supplies sensor data from each sensor to each unit of the vehicle control system 11. The types and number of sensors included in the vehicle sensor 27 are arbitrary.

For example, the vehicle sensor 27 includes a speed sensor, an acceleration sensor, an angular velocity sensor (a gyro sensor), and an inertial measurement unit (IMU). For example, the vehicle sensor 27 includes a steering angle sensor that detects a steering angle of a steering wheel, a yaw rate sensor, an accelerator sensor that detects an operation amount of an accelerator pedal, and a brake sensor that detects an operation amount of a brake pedal. For example, the vehicle sensor 27 includes a rotation sensor that detects the rotation speed of the engine or the motor, an air pressure sensor that detects the air pressure of the tire, a slip rate sensor that detects the slip rate of the tire, and a wheel speed sensor that detects the rotation speed of the wheel. For example, the vehicle sensor 27 includes a battery sensor that detects the remaining amount and temperature of the battery, and an impact sensor that detects an external impact.

The recording unit 28 includes, for example, a read only memory (ROM), a random access memory (RAM), a magnetic storage device such as a hard disk drive (HDD), a semiconductor storage device, an optical storage device, a magneto-optical storage device, and the like. The recording unit 28 records various programs, data, and the like used by each unit of the vehicle control system 11. For example, the recording unit 28 records a rosbag file including a message transmitted and received by a Robot Operating System (ROS) in which an application program related to automatic driving operates. For example, the recording unit 28 includes an Event Data Recorder (EDR) and a DSSAD Data Storage System for Automated Driving (DSSAD), and records information of the vehicle 1 before and after an event such as an accident.

The travel assistance/automatic driving control unit 29 controls travel support and automatic driving of the vehicle 1. For example, the travel assistance/automatic driving control unit 29 includes an analysis unit 61, an action planning unit 62, and an operation control unit 63.

The analysis unit 61 performs analysis processing of the situation of the vehicle 1 and the surroundings. The analysis unit 61 includes a self-position estimation unit 71, a sensor fusion unit 72, and the recognition unit 73.

The self-position estimation unit 71 estimates the self-position of the vehicle 1 on the basis of the sensor data from the external recognition sensor 25 and the high-precision map accumulated in the map information accumulation unit 23. For example, the self-position estimation unit 71 generates a local map on the basis of sensor data from the external recognition sensor 25, and estimates the self-position of the vehicle 1 by matching the local map with the high-precision map. The position of the vehicle 1 is based on, for example, the center of the rear wheel pair axle.

The local map is, for example, a three-dimensional high-precision map created using a technique such as simultaneous localization and mapping (SLAM), an occupancy grid map, or the like. The three-dimensional high-precision map is, for example, the above-described point cloud map or the like. The occupancy grid map is a map in which a three-dimensional or two-dimensional space around the vehicle 1 is divided into grids of a predetermined size, and an occupancy state of an object is indicated in units of grids. The occupancy state of the object is indicated by, for example, the presence or absence or existence probability of the object. For example, the local map is also used for detection processing and recognition processing of a situation outside the vehicle 1 by the recognition unit 73.

Note that the self-position estimation unit 71 may estimate the self-position of the vehicle 1 on the basis of the GNSS signal and the sensor data from the vehicle sensor 27.

The sensor fusion unit 72 performs sensor fusion processing of combining a plurality of different types of sensor data (for example, image data supplied from the camera 51 and sensor data supplied from the radar 52) to obtain new information. Methods for combining different types of sensor data include integration, fusion, association, and the like.

The recognition unit 73 performs detection processing and recognition processing of a situation outside the vehicle 1.

For example, the recognition unit 73 performs detection processing and recognition processing of a situation outside the vehicle 1 on the basis of information from the external recognition sensor 25, information from the self-position estimation unit 71, information from the sensor fusion unit 72, and the like.

Specifically, for example, the recognition unit 73 performs detection processing, recognition processing, and the like of an object around the vehicle 1. The object detection processing is, for example, processing of detecting the presence or absence, size, shape, position, movement, and the like of an object. The object recognition processing is, for example, processing of recognizing an attribute such as a type of the object or identifying a specific object. However, the detection processing and the recognition processing are not necessarily clearly divided, and may overlap.

For example, the recognition unit 73 detects the object around the vehicle 1 by performing clustering for classifying point clouds based on sensor data of the LiDAR, the radar, and the like for each cluster of point clouds. Therefore, the presence or absence, the size, the shape, and the position of the object around the vehicle 1 are detected.

For example, the recognition unit 73 detects the motion of the object around the vehicle 1 by performing tracking that follows the motion of the mass of the point cloud classified by clustering. Therefore, the speed and the traveling direction (the movement vector) of the object around the vehicle 1 are detected.

For example, the recognition unit 73 recognizes the type of the object around the vehicle 1 by performing object recognition processing of semantic segmentation or the like on the image data supplied from the camera 51.

Note that, as the object to be detected or recognized, for example, a vehicle, a person, a bicycle, an obstacle, a structure, a road, a traffic light, a traffic sign, a road sign, and the like are assumed.

For example, the recognition unit 73 performs recognition processing of traffic rules around the vehicle 1 on the basis of the map accumulated in the map information accumulation unit 23, the estimation result of the self position, and the recognition result of the object around the vehicle 1. By this processing, for example, the position and the state of the signal, the contents of the traffic sign and the road sign, the contents of the traffic regulation, the travelable lane, and the like are recognized.

For example, the recognition unit 73 performs recognition processing of the environment around the vehicle 1. As the surrounding environment to be recognized, for example, weather, temperature, humidity, brightness, a state of a road surface, and the like are assumed.

The action planning unit 62 creates an action plan of the vehicle 1. For example, the action planning unit 62 creates an action plan by performing processing of path planning and route following.

Note that the global path planning is processing of planning a rough path from the start to the goal. This route plan is called a track plan, and includes processing of local path planning that enables safe and smooth traveling in the vicinity of the vehicle 1 in consideration of the motion characteristics of the vehicle 1 in the route planned by the route plan.

The route following is processing of planning an operation for safely and accurately traveling a route planned by a route plan within a planned time. For example, the target speed and the target angular velocity of the vehicle 1 are calculated.

The operation control unit 63 controls the operation of the vehicle 1 in order to realize the action plan created by the action planning unit 62.

For example, the operation control unit 63 controls a steering control unit 81, a brake control unit 82, and a drive control unit 83 to perform acceleration/deceleration control and direction control such that the vehicle 1 travels on the track calculated by the track plan. For example, the operation control unit 63 performs cooperative control for the purpose of implementing the functions of the ADAS such as collision avoidance or impact mitigation, follow-up traveling, vehicle speed maintaining traveling, collision warning of the host vehicle, and lane deviation warning of the host vehicle. For example, the operation control unit 63 performs cooperative control for the purpose of automatic driving or the like in which the vehicle autonomously travels without depending on the operation of the driver.

The DMS 30 performs a driver authentication process, a driver state recognition process, and the like on the basis of sensor data from the in-vehicle sensor 26, input data input to the HMI 31, and the like. As the state of the driver to be recognized, for example, a physical condition, a wakefulness level, a concentration level, a fatigue level, a line-of-sight direction, a drunkenness level, a driving operation, a posture, and the like are assumed.

Note that the DMS 30 may perform authentication processing of a passenger other than the driver and recognition processing of the state of the passenger. Furthermore, for example, the DMS 30 may perform recognition processing of the situation inside the vehicle on the basis of sensor data from the in-vehicle sensor 26. As the situation inside the vehicle to be recognized, for example, temperature, humidity, brightness, odor, and the like are assumed.

The HMI 31 is used for inputting various data, instructions, and the like, generates an input signal on the basis of the input data, instructions, and the like, and supplies the input signal to each unit of the vehicle control system 11. For example, the HMI 31 includes an operation device such as a touch panel, a button, a microphone, a switch, and a lever, an operation device that can be input by a method other than manual operation by voice, gesture, or the like, and the like. Note that the HMI 31 may be, for example, a remote control device using infrared rays or other radio waves, or an external connection device such as a mobile device or a wearable device compatible with the operation of the vehicle control system 11.

Furthermore, the HMI 31 performs output control to control generation and output of visual information, auditory information, and tactile information to the passenger or the outside of the vehicle, output content, output timing, an output method, and the like. The visual information is, for example, information indicated by an image or light such as an operation screen, a state display of the vehicle 1, a warning display, or a monitor image indicating a situation around the vehicle 1. The auditory information is, for example, information indicated by a voice such as guidance, a warning sound, or a warning message. The tactile information is, for example, information given to the tactile sense of the passenger by force, vibration, motion, or the like.

As a device that outputs the visual information, for example, a display device, a projector, a navigation device, an instrument panel, a camera monitoring system (CMS), an electronic mirror, a lamp, and the like are assumed. The display device may be a device that displays visual information in the field of view of the passenger, for example, such as a head-up display, a transmissive display, or a wearable device having an augmented reality (AR) function, in addition to a device having a normal display.

As a device that outputs auditory information, for example, an audio speaker, a headphone, an earphone, or the like is assumed.

As a device that outputs the tactile information, for example, a haptic element using haptics technology or the like is assumed. The haptics element is provided, for example, on a steering wheel, a seat, or the like.

The vehicle control unit 32 controls each unit of the vehicle 1. The vehicle control unit 32 includes the steering control unit 81, the brake control unit 82, the drive control unit 83, a body system control unit 84, a light control unit 85, and a horn control unit 86.

The steering control unit 81 performs detection, control, and the like of the state of the steering system of the vehicle 1. The steering system includes, for example, a steering mechanism including a steering wheel and the like, an electric power steering, and the like. The steering control unit 81 includes, for example, a control unit such as an ECU that controls the steering system, an actuator that drives the steering system, and the like.

The brake control unit 82 performs detection, control, and the like of the state of the brake system of the vehicle 1. The brake system includes, for example, a brake mechanism including a brake pedal and the like, an antilock brake system (ABS), and the like. The brake control unit 82 includes, for example, a control unit such as an ECU that controls a brake system, an actuator that drives the brake system, and the like.

The drive control unit 83 performs detection, control, and the like of the state of the drive system of the vehicle 1. The drive system includes, for example, a driving force generation device for generating a driving force such as an accelerator pedal, an internal combustion engine, or a driving motor, a driving force transmission mechanism for transmitting the driving force to wheels, and the like. The drive control unit 83 includes, for example, a control unit such as an ECU that controls the drive system, an actuator that drives the drive system, and the like.

The body system control unit 84 performs detection, control, and the like of the state of the body system of the vehicle 1. The body system includes, for example, a keyless entry system, a smart key system, a power window device, a power seat, an air conditioner, an airbag, a seat belt, a shift lever, and the like. The body system control unit 84 includes, for example, a control unit such as an ECU that controls the body system, an actuator that drives the body system, and the like.

The light control unit 85 performs detection, control, and the like of the states of various lights of the vehicle 1. As the light to be controlled, for example, a headlight, a backlight, a fog light, a turn signal, a brake light, a projection, a display of a bumper, and the like are assumed. The light control unit 85 includes a control unit such as an ECU that controls light, an actuator that drives light, and the like.

The horn control unit 86 performs detection, control, and the like of the state of the car horn of the vehicle 1. The horn control unit 86 includes, for example, a control unit such as an ECU that controls the car horn, an actuator that drives the car horn, and the like.

Figure 2:
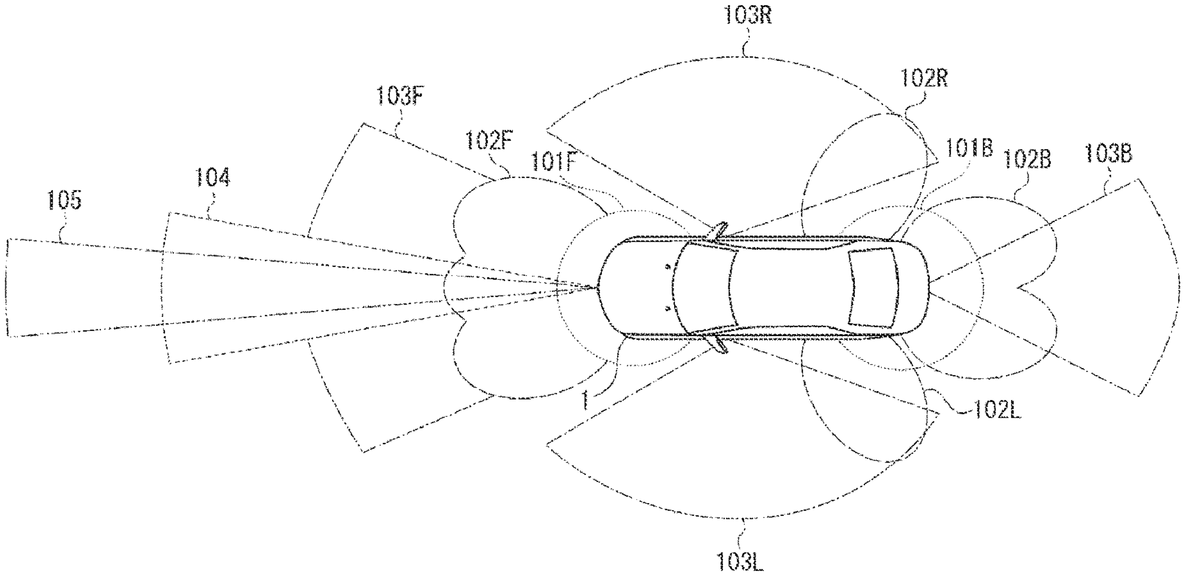
FIG. 2 is a diagram illustrating an example of a sensing region.

FIG. 2 is a diagram illustrating an example of the sensing region by the camera 51, the radar 52, the LiDAR 53, and the ultrasonic sensor 54 of the external recognition sensor 25 in FIG. 1.

A sensing region 101F and a sensing region 101B illustrate examples of the sensing region of the ultrasonic sensor 54. The sensing region 101F covers the periphery of the front end of the vehicle 1. The sensing region 101B covers the periphery of the rear end of the vehicle 1.

The sensing results in the sensing region 101F and the sensing region 101B are used, for example, for parking assistance or the like of the vehicle 1.

The sensing regions 102F to 102B illustrate examples of sensing regions of the radar 52 for a short distance or a middle distance. The sensing region 102F covers a position farther than the sensing region 101F in front of the vehicle 1. The sensing region 102B covers a position farther than the sensing region 101B behind the vehicle 1. A sensing region 102L covers the rear periphery of the left side surface of the vehicle 1. A sensing region 102R covers the rear periphery of the right side surface of the vehicle 1.

The sensing result in the sensing region 102F is used, for example, to detect a vehicle, a pedestrian, or the like existing in front of the vehicle 1. The sensing result in the sensing region 102B is used, for example, for a collision prevention function or the like behind the vehicle 1. The sensing results in the sensing region 102L and the sensing region 102R are used, for example, for detecting an object in a blind spot on the side of the vehicle 1, or the like.

A sensing regions 103F to 103B illustrate examples of sensing regions by the camera 51. The sensing region 103F covers a position farther than the sensing region 102F in front of the vehicle 1. The sensing region 103B covers a position farther than the sensing region 102B behind the vehicle 1. A sensing region 103L covers the periphery of the left side surface of the vehicle 1. A sensing region 103R covers the periphery of the right side surface of the vehicle 1.

The sensing result in the sensing region 103F is used for, for example, recognition of a traffic light or a traffic sign, a lane departure prevention assist system, and the like. The sensing result in the sensing region 103B is used for, for example, parking assistance, a surround view system, and the like. The sensing results in the sensing region 103L and the sensing region 103R are used, for example, in a surround view system or the like.

The sensing region 104 shows an example of a sensing region of the LiDAR 53. The sensing region 104 covers a position farther than the sensing region 103F in front of the vehicle 1. On the other hand, the sensing region 104 has a narrower range in the left-right direction than the sensing region 103F.

The sensing result in the sensing region 104 is used for, for example, emergency braking, collision avoidance, pedestrian detection, and the like.

The sensing region 105 illustrates an example of the sensing region of the long-range radar 52. The sensing region 105 covers a position farther than the sensing region 104 in front of the vehicle 1. On the other hand, the sensing region 105 has a narrower range in the left-right direction than the sensing region 104.

The sensing result in the sensing region 105 is used for, for example, adaptive cruise control (ACC) or the like.

Note that the sensing region of each sensor may have various configurations other than those in FIG. 2. Specifically, the ultrasonic sensor 54 may also sense the side of the vehicle 1, or the LiDAR 53 may sense the rear of the vehicle 1.

2. EMBODIMENTS

Next, an embodiment of the present technology will be described with reference to FIGS. 3A, 3B, 3C, 4, 5, 6, 7, 8, and 9.

Configuration Example of Seat 201

First, a configuration example of a seat 201 to which the present technology is applied will be described with reference to FIGS. 3A, 3B, 3C, 4, 5, 6, and 7.

Figure 3A:
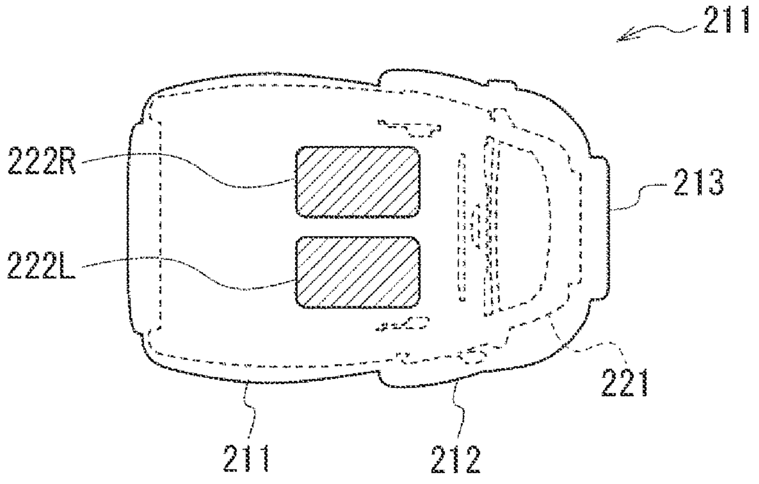
FIGS. 3A, 3B, and 3C are schematic diagrams illustrating a configuration example of a seat to which the present technology is applied.
Figure 3B:
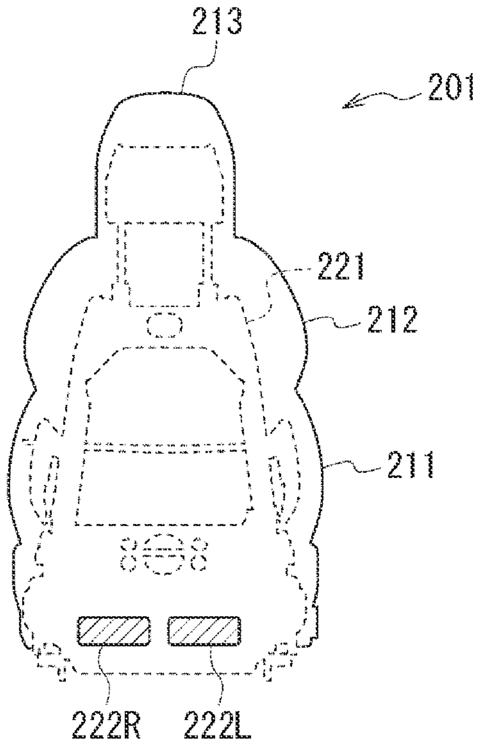
Figure 3C:
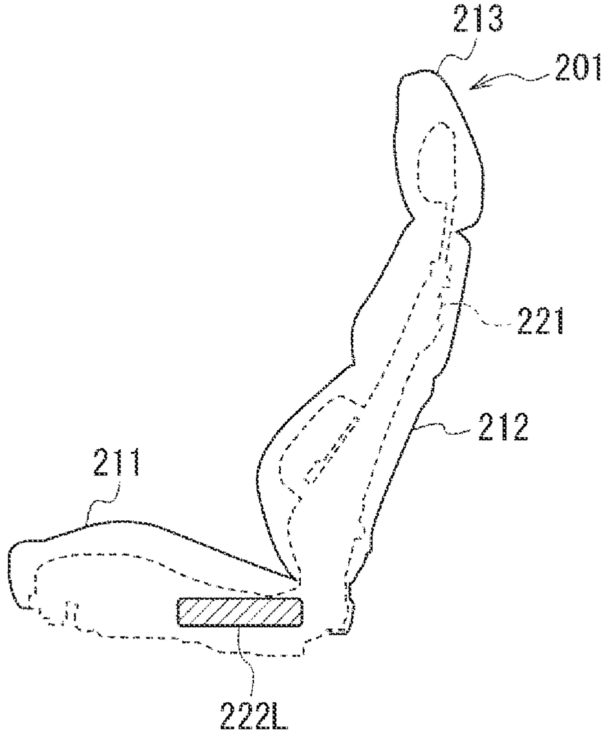

FIGS. 3A, 3B, and 3C schematically illustrate a configuration of the entire seat 201. FIG. 3A is a plan view of the seat 201, FIG. 3B is a front view of the seat 201, and FIG. 3C is a left side view of the seat 201.

The seat 201 is used for, for example, a driver seat, a passenger seat, a rear seat, and the like of the vehicle 1. The seat 201 includes a seat cushion 211, a seat back 212, and a headrest 213.

The seat cushion 211 serves as a seat surface of the seat 201 and is a portion on which the user sits. The seat cushion 211 is gently inclined downward from the front to the rear, and a portion with which the gluteal portions of the seated user are in contact is lower than a portion with which the femoral portions are in contact. Furthermore, the left and right end portions of the seat cushion 211 protrude upward from the central portion.

The seat back 212 is a portion serving as a backrest of a seated user. The seat back 212 is gently inclined rearward from the lower direction to the upper direction. Furthermore, the left and right ends of the seat back 212 project forward from the center.

With the features of the seat cushion 211 and the seat back 212, the posture (seating position) of the user can be stabilized.

The headrest 213 is a portion that supports the head of the seated user and protects the head and neck of the user.

Furthermore, the seat 201 incorporates a frame 221 serving as a frame of the seat, and an adjustment portion 222L and an adjustment portion 222R.

The adjustment portion 222L is disposed between the frame 221 and a left gluteal contact portion including a portion assumed to be in contact with the left gluteal portion of the seated user on the surface (that is, the seat surface of the seat 201) of the seat cushion 211. As described later, the adjustment portion 222L adjusts the hardness of the left gluteal contact portion of the seat cushion 211.

The adjustment portion 222R is disposed between the frame 221 and a right gluteal contact portion including a portion assumed to be in contact with the right gluteal portion of the seated user on the surface (the seat surface of the seat 201) of the seat cushion 211. As described later, the adjustment portion 222R adjusts the hardness of the right gluteal contact portion of the seat cushion 211.

Configuration Example of Seat Cushion 211

Next, a configuration example of the seat cushion 211 will be described with reference to FIGS. 4 and 5.

Figure 4:
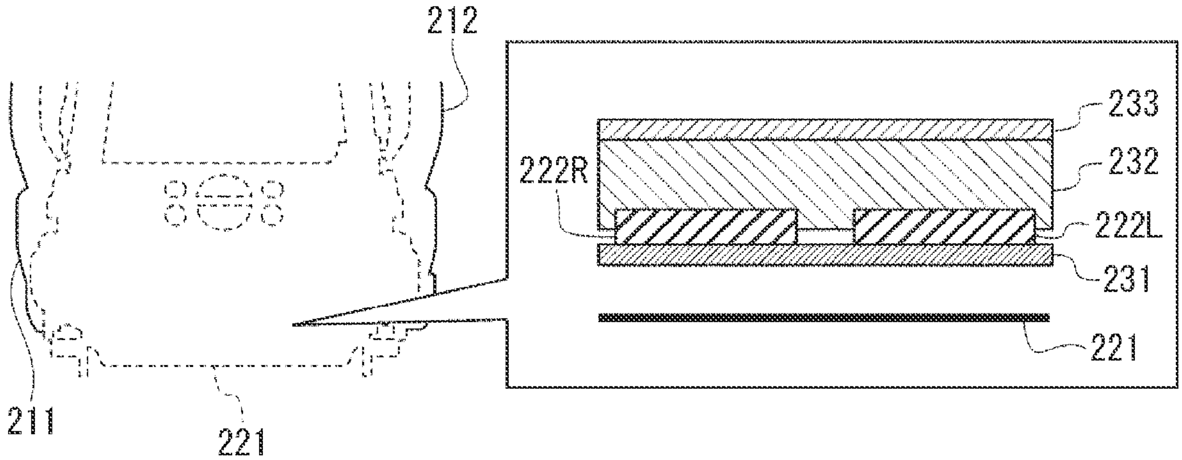
FIG. 4 is a schematic view illustrating an internal configuration example of a seat cushion.
Figure 5:
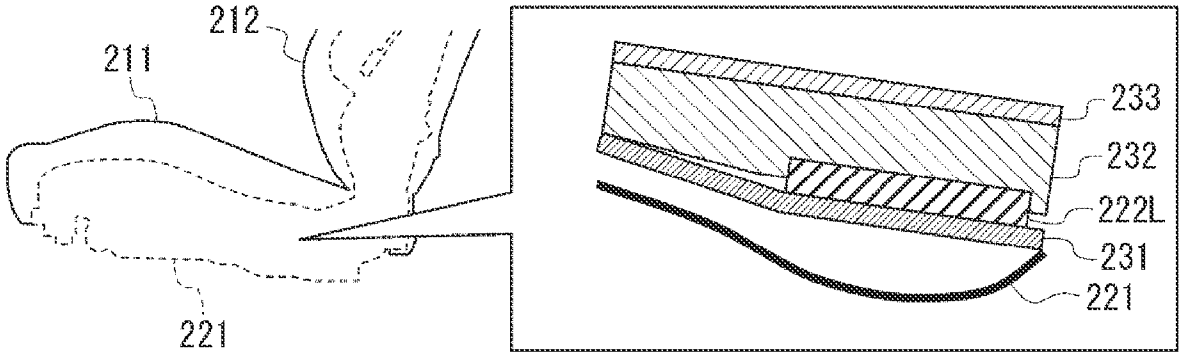
FIG. 5 is a schematic view illustrating the internal configuration example of the seat cushion.

FIG. 4 is a schematic view of an internal structure in a case where the seat cushion 211 is viewed from the front. FIG. 5 is a schematic view of an internal structure in a case where the seat cushion 211 is viewed from the left side.

Inside the seat cushion 211, the frame 221, a support member 231, the adjustment portion 222L and the adjustment portion 222R, a pad 232, and a skin 233 are laminated in this order from the bottom.

The support member 231 is disposed below the pad 232 with a gap from the frame 221, for example. The support member 231 includes a metal net, a nonwoven fabric, or the like, has a higher elastic modulus than the pad 232, and is less likely to deform. The support member 231 supports the pad 232 and suppresses excessive deformation of the pad 232 in the downward direction when the user is seated.

The pad 232 is an elastic member having elasticity, and includes, for example, polyurethane foam. The upper surface of the pad 232 has substantially the same shape as the seat surface of the seat 201. The pad 232 supports the gluteal portion and the femoral portion of the seated user and absorbs impact and vibration applied from the outside.

The skin 233 includes a predetermined material, for example, such as leather, artificial leather, or cloth. The skin 233 covers and protects the surface of the pad 232.

The adjustment portion 222L is provided between the support member 231 and the pad 232 below the left gluteal contact portion of the seat cushion 211. The hardness of the adjustment portion 222L can be adjusted, and the hardness of the left gluteal contact portion of the seat cushion 211 is adjusted by adjusting the hardness of the adjustment portion 222L.

The adjustment portion 222R is provided between the support member 231 and the pad 232 below the right gluteal contact portion of the seat cushion 211. The hardness of the adjustment portion 222R can be adjusted, and the hardness of the right gluteal contact portion of the seat cushion 211 is adjusted by adjusting the hardness of the adjustment portion 222R.

Note that, hereinafter, in a case where it is not necessary to individually distinguish the adjustment portion 222L and the adjustment portion 222R, they are simply referred to as the adjustment portion 222.

Configuration Example of Adjustment Portion 222L

Next, a configuration example of the adjustment portion 222L will be described with reference to FIGS. 6 and 7.

First Embodiment of Adjustment Portion 222L

Figure 6:
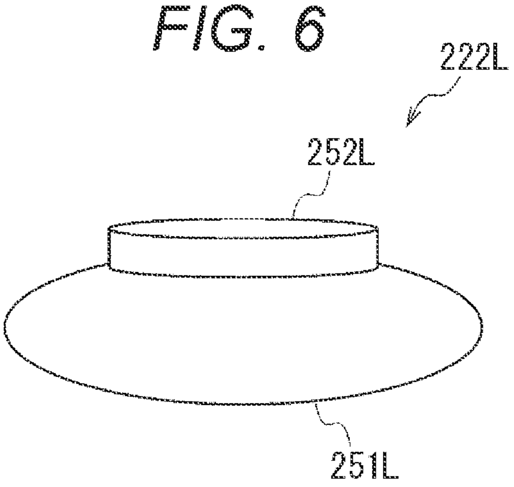
FIG. 6 is a schematic diagram illustrating a first embodiment of a left adjustment portion.

FIG. 6 schematically illustrates the first embodiment of the adjustment portion 222L.

In this example, the adjustment portion 222L includes an air adjusted lumbar 251L and a plate 252L.

The air adjusted lumbar 251L is a bag-shaped member capable of taking in and out and holding air. The shape and hardness (elastic modulus) of the air adjusted lumbar 251L can be adjusted by the filling amount of air.

The plate 252L is a plate-shaped member that includes metal, plastic, or the like and is less likely to change in shape. The plate 252L is attached and fixed to the upper surface of the air adjusted lumbar 251L below the left gluteal contact portion of the seat cushion 211. Therefore, the plate 252L supports the left gluteal portions of the user seated on the seat 201 via the pad 232 and the skin 233.

For example, by increasing the filling amount in the air adjusted lumbar 251L, the air adjusted lumbar 251L becomes large, hard, and hardly deformed. Therefore, the left gluteal contact portion of the seat cushion 211 becomes hard. On the other hand, by reducing the filling amount of air in the air adjusted lumbar 251L, the air adjusted lumbar 251L becomes small, soft, and easily deformed. Therefore, the left gluteal contact portion of the seat cushion 211 becomes soft.

Here, the shape of the plate 252L hardly changes due to the shape change of the air adjusted lumbar 251L. Therefore, when the shape (size) of the air adjusted lumbar 251L changes, the hardness of the left gluteal contact portion of the seat cushion 211 changes substantially uniformly by the action of the plate 252L. Note that since the pad 232 is provided above the plate 252L, the user does not directly feel the hardness of the plate 252L.

Furthermore, the hardness of the portion of the seat cushion 211 that is in contact with the femoral portion of the user before the left gluteal contact portion hardly changes. Therefore, it is possible to prevent the blood flow in the vicinity of the femoral portion of the user from being obstructed to give discomfort to the user.

Second Embodiment of Adjustment Portion 222L

Figure 7:
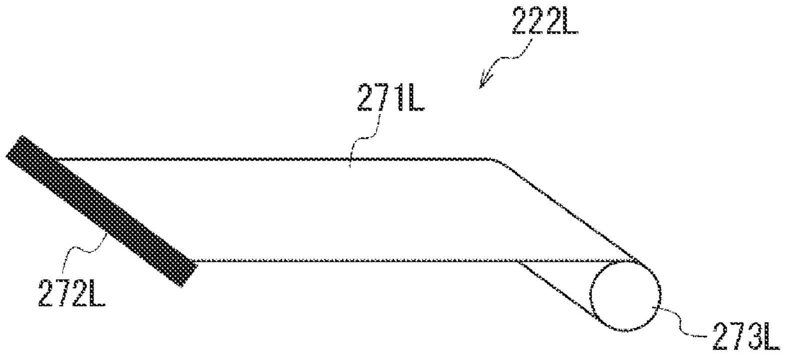
FIG. 7 is a schematic diagram illustrating a second embodiment of a left adjustment portion.

FIG. 7 schematically illustrates a second embodiment of the adjustment portion 222L.

In this example, the adjustment portion 222L includes a band 271L, a fixing member 272L, and a winding member 273L.

The band 271L is a sheet-like member having flexibility, and includes, for example, cloth. The front end of the band 271L is fixed by the fixing member 272L, and the rear end is windably supported by the winding member 273L.

The fixing member 272L is provided below a position slightly before the front end of the left gluteal contact portion of the seat cushion 211. The winding member 273L is provided below a position slightly behind the rear end of the left gluteal contact portion of the seat cushion 211. Furthermore, the fixing member 272L and the winding member 273L are provided at substantially the same height.

Therefore, the band 271L spreads in a substantially horizontal plane shape below the left gluteal contact portion of the seat cushion 211, and supports the left gluteal portion of the user seated on the seat 201 via the pad 232 and the skin 233. Furthermore, the hardness (the elastic modulus) of the surface of the band 271L becomes substantially uniform.

Furthermore, the fixing member 272L and the winding member 273L include an adjustment mechanism that adjusts the force of pulling the band 271L in the plane direction. Specifically, the winding member 273L is rotated in the front-rear direction about an axis in the longitudinal direction (left-right direction) by an actuator (not illustrated).

When the winding member 273L rotates in the rear direction, the rear is wound while the front end of the band 271L is fixed by the fixing member 272L, and the force of pulling the band 271L in the surface direction becomes strong. Therefore, the band 271L becomes hard and hardly deformed (the elastic modulus becomes high), and the left gluteal contact portion of the seat cushion 211 becomes hard.

On the other hand, when the winding member 273L rotates in the front direction, the rear is unwound while the front end of the band 271L is fixed by the fixing member 272L, and the force of pulling the band 271L in the plane direction becomes weak. Therefore, the band 271L becomes soft and easily deformed (the elastic modulus decreases), and the left gluteal contact portion of the seat cushion 211 becomes soft.

Furthermore, as described above, since the hardness of the surface of the band 271L is substantially uniform, the hardness of the left gluteal contact portion of the seat cushion 211 uniformly changes by winding or unwinding the band 271L with the winding member 273L.

Moreover, the hardness of the portion of the seat cushion 211 that is in contact with the femoral portion of the user before the left gluteal contact portion hardly changes. Therefore, it is possible to prevent the blood flow in the vicinity of the femoral portion of the user from being obstructed to give discomfort to the user.

Note that the adjustment portion 222R also has the similar configuration as the adjustment portion 222L in FIG. 6 or 7, and description and illustration thereof are omitted. Furthermore, hereinafter, it is assumed that a letter R is added to the end of the reference sign of each unit configuring the adjustment portion 222R instead of a letter L.

Configuration Example of System for Controlling Hardness of Seat Surface of Seat 201

Figure 8:
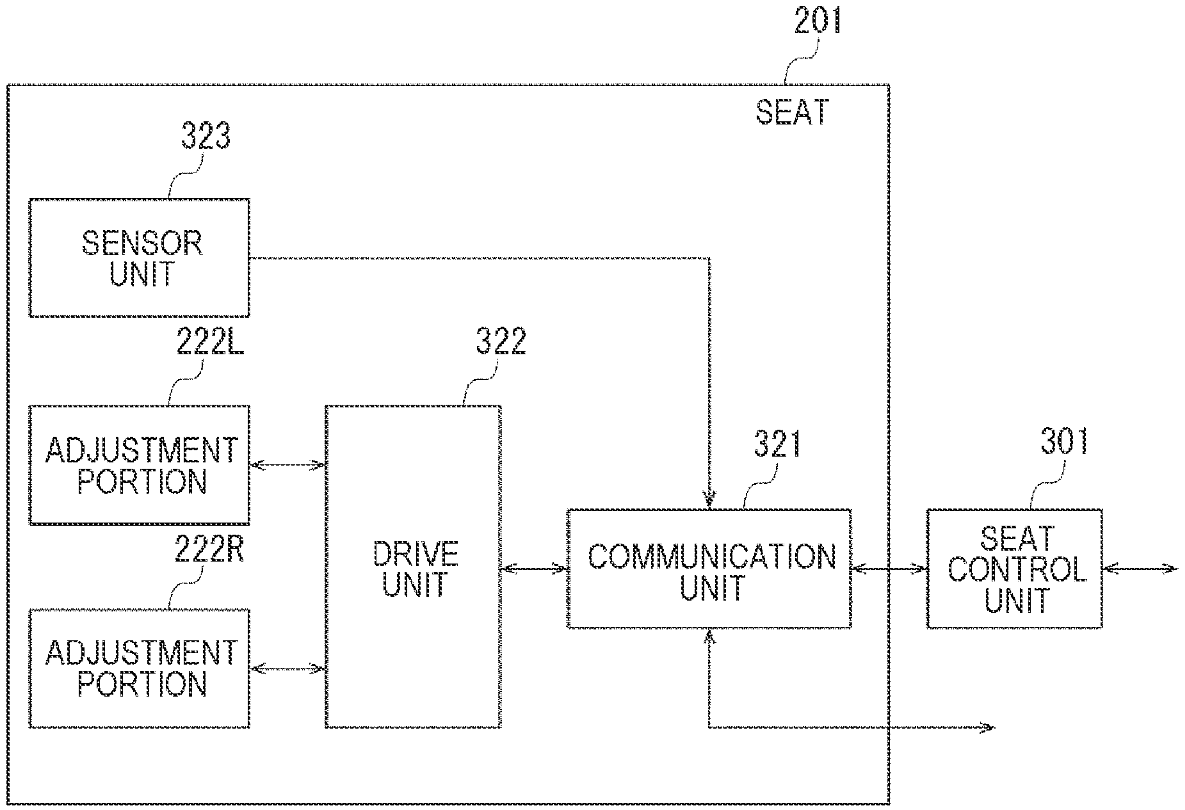
FIG. 8 is a block diagram illustrating a configuration example of a system that controls hardness of a seat surface of a seat.

FIG. 8 illustrates a configuration example of a system that controls hardness of a seat surface of the seat 201 (hardness of the seat cushion 211).

The system includes a seat control unit 301. Furthermore, the seat 201 includes a communication unit 321, a drive unit 322, and a sensor unit 323 in addition to the above-described configuration.

The seat control unit 301 includes, for example, a part of the body system control unit 84 in FIG. 1. The seat control unit 301 controls, for example, the hardness of the seat surface of the seat 201, that is, the hardness of the seat cushion 211.

For example, the seat control unit 301 acquires sensor data output from each sensor included in the sensor unit 323 of the seat 201 from the seat 201. The seat control unit 301 acquires information indicating a result of detection processing and recognition processing of a situation outside the vehicle 1 from the recognition unit 73 (FIG. 1). The seat control unit 301 acquires information regarding control of the operation of the vehicle 1 from the operation control unit 63 (FIG. 1). The seat control unit 301 acquires information indicating a result of the recognition processing of the state of the driver from the DMS 30 (FIG. 1). The seat control unit 301 acquires an input signal based on various items of data, instructions, and the like from the HMI 31 (FIG. 1).

The seat control unit 301 generates a control signal for controlling the hardness of the adjustment portion 222L and the adjustment portion 222R on the basis of the acquired various types of information, data, signals, and the like, and transmits the control signal to the seat 201.

Furthermore, the seat control unit 301 controls the position of the entire seat 201 in the vertical direction by controlling a drive unit including, for example, an actuator (not illustrated) or the like on the basis of the acquired various types of information, data, signals, and the like.

The communication unit 321 communicates with each unit of the vehicle 1 including the seat control unit 301 by a predetermined communication method (for example, CAN) to exchange various kinds of information, data, signals, and the like (for example, the sensor data, the control signal, and the like described above.).

The drive unit 322 individually adjusts the hardness of the adjustment portion 222L and the adjustment portion 222R by individually driving the adjustment portion 222L and the adjustment portion 222R according to the control signal from the seat control unit 301.

For example, in a case where the adjustment portion 222L and the adjustment portion 222R have the configuration of FIG. 6, the drive unit 322 includes a device that controls taking in and out of the air of the air adjusted lumbar 251L and the air adjusted lumbar 251R. Then, the drive unit 322 adjusts the hardness of the adjustment portion 222L and the adjustment portion 222R by controlling the taking in and out of the air of the air adjusted lumbar 251L and the air adjusted lumbar 251R. Therefore, the hardness of the seat surface of the seat 201, more specifically, the hardness of the left gluteal contact portion and the hardness of the right gluteal contact portion of the seat cushion 211 are individually adjusted.

For example, in a case where the adjustment portion 222L and the adjustment portion 222R have the configuration of FIG. 7, the drive unit 322 includes an actuator or the like that rotates the winding member 273L and the winding member 273R. Then, the drive unit 322 individually controls the rotation of the winding member 273L and the winding member 273R to individually adjust the hardness of the band 271L and the hardness of the band 271R. Therefore, the hardness of the seat surface of the seat 201, more specifically, the hardness of the left gluteal contact portion and the hardness of the right gluteal contact portion of the seat cushion 211 are individually adjusted.

The sensor unit 323 includes, for example, a part of the in-vehicle sensor 26 in FIG. 1, and includes various sensors. The sensor unit 323 supplies sensor data from each sensor to the communication unit 321.

For example, in a case where the adjustment portion 222L and the adjustment portion 222R have the configuration of FIG. 6, the sensor unit 323 includes load meters. The load meters are provided, for example, on each of the upper surface of the plate 252L of the adjustment portion 222L and the upper surface of the plate 252R of the adjustment portion 222R. Each load meter detects a load applied to the plate 252L or the plate 252R, and supplies sensor data indicating a detection result to the communication unit 321.

For example, in a case where the adjustment portion 222L and the adjustment portion 222R have the configuration of FIG. 7, the sensor unit 323 includes load meters. The load meters are provided, for example, on each of the upper surface of the band 271L of the adjustment portion 222L and the upper surface of the band 271R of the adjustment portion 222R. Each load meter detects a load applied to the band 271L or the band 271R, and supplies sensor data indicating a detection result to the communication unit 321.

<Seat Control Processing>

Figure 9:
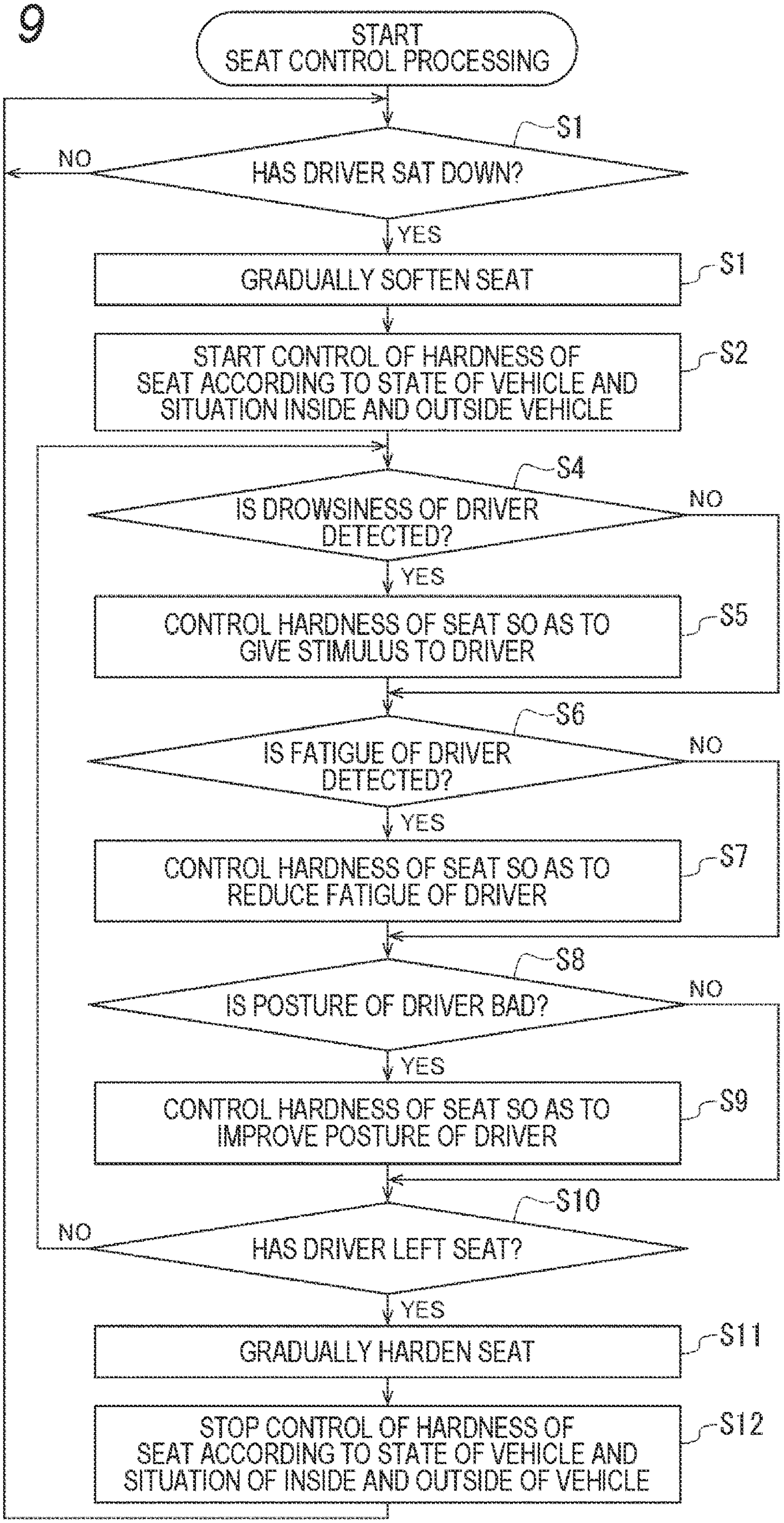
FIG. 9 is a flowchart for explaining seat control processing.

Next, seat control processing executed by the vehicle 1 will be described with reference to a flowchart of FIG. 9.

Note that, an example of a case where the driver's seat 201 is mainly controlled will be described in below. Furthermore, the user seated on the driver's seat is referred to as a driver in below.

In step S1, the DMS 30 determines whether or not the driver has directly sat down. This processing is repeatedly executed at a predetermined timing until it is determined that the driver has been seated, and in a case where it is determined that the driver has been seated, the process proceeds to step S2.

Note that a method for determining whether or not the driver is seated is not particularly limited.

For example, the DMS 30 determines whether or not the driver is seated on the basis of image data for capturing the direction of the driver's seat.

For example, the DMS 30 determines whether or not the driver is seated on the basis of a load to each adjustment portion 222 detected by sensor data from the sensor unit 323 of the seat 201 in the driver's seat.

For example, the DMS 30 determines whether or not the driver is seated on the basis of the result of performing the process of detecting the approach of the key, the smartphone, or the like of the vehicle 1 on the basis of the state of the short-range wireless communication between the key, the smartphone, or the like of the vehicle 1 owned by the driver and the communication unit 22.

In step S2, the seat control unit 301 gradually softens the seat 201.

For example, each of the adjustment portions 222 of the driver's seat 201 is set to the hardest state before the driver sits on the seat, and the seat surface of the driver's seat 201 is set to the highest position. Then, the seat control unit 301 controls the drive unit 322 to gradually soften each adjustment portion 222 to a predetermined hardness.

Therefore, the driver can easily sit on the seat 201, and a comfortable state can be quickly provided to the driver after sitting.

Note that the hardness of the seat 201 set after seating may be fixed or variable. In a case where the hardness to be set is variable, for example, the hardness may be set to a desired hardness by the driver or the like, or the hardness may be set to the learned hardness by learning the hardness desired by the driver through learning processing.

Furthermore, for example, in a case where the entire seat 201 moves in the downward direction and the seat surface (the seat cushion 211) of the seat 201 moves in the downward direction when the driver sits down, each adjustment portion 222 may be softened in accordance with the movement of the seat surface of the seat 201 in the downward direction.

In step S3, the seat control unit 301 starts control of the hardness of the seat 201 according to the state of the vehicle 1 and the situation inside and outside the vehicle (inside and outside of the vehicle 1).

For example, the seat control unit 301 acquires information indicating a driving mode of the vehicle from the operation control unit 63 or the HMI 31, and starts processing of controlling the hardness of each adjustment portion 222 on the basis of the driving mode.

For example, in a case where the driving mode is set to a traveling mode in which quick driving is prioritized, the seat control unit 301 sets each adjustment portion 222 to be hard. On the other hand, in a case where the driving mode is set to the traveling mode in which comfort in the vehicle is prioritized, the seat control unit 301 sets each adjustment portion 222 to be soft. Therefore, the driver can easily feel the change in the driving mode.

For example, in a case where the driving mode is set to the automatic driving mode, the seat control unit 301 softens each adjustment portion 222. That is, in a case where the automatic driving is performed, it is not necessary to stabilize the driving position of the driver, and thus, the sitting comfort of the driver is prioritized, and the left gluteal contact portion and the right gluteal contact portion of the seat cushion 211 are softened.

Furthermore, for example, the seat control unit 301 starts processing of controlling the hardness of the left and right adjustment portions 222 and controlling the balance of the left and right hardness of the seat cushion 211 on the basis of the lateral acceleration (lateral G) acting on the vehicle 1 detected by the vehicle sensor 27.

For example, in a case where the lateral acceleration is equal to or greater than a predetermined threshold value, the seat control unit 301 hardens the adjustment portion 222 in the direction opposite to the direction in which the lateral acceleration acts, that is, in the direction opposite to the turning direction of the vehicle 1 in the yaw direction, and restores the hardness of the adjustment portion 222 to the original hardness after the lateral acceleration becomes less than the threshold value. Therefore, for example, in a case where the vehicle 1 turns clockwise, the left gluteal contact portion of the seat cushion 211 is harder than the right gluteal contact portion. Conversely, in a case where the vehicle 1 turns counterclockwise, the right gluteal contact portion of the seat cushion 211 is harder than the left gluteal contact portion. As a result, it becomes easy for the driver to maintain the posture while facing the lateral acceleration and the fatigue level of the driver is reduced.

Note that, for example, there is a vehicle in which the air adjusted lumbar supports are provided on the left and right sides of the seat back to control the balance of the hardness of the left and right sides of the seat back on the basis of the lateral acceleration. However, in this case, when the lateral acceleration is not so large and the movement of the body of the driver is not so large, the body of the driver does not come into contact with the air adjusted lumbar, so that the effect cannot be obtained.

On the other hand, in the vehicle 1, regardless of the lateral acceleration, the balance of the hardness of the left gluteal contact portion and the right gluteal contact portion of the seat cushion 211 with which the body of the driver is constantly in contact is controlled. Therefore, the effect can be always obtained regardless of the magnitude of the lateral acceleration.

Note that the seat control unit 301 may control the balance between the left and right hardness of the seat cushion 211 on the basis of, for example, the steering angle of the vehicle 1 or the rotation angle of the steering wheel instead of the lateral acceleration.

Moreover, for example, the seat control unit 301 controls the left and right hardness of the adjustment portion 222 on the basis of the result of predicting the turning of the vehicle 1 in the yaw direction, and starts processing of controlling the balance of the left and right hardness of the seat cushion 211.

For example, in a case where the turning of the vehicle 1 in the yaw direction is predicted, the recognition unit 73 estimates the lateral acceleration acting on the vehicle 1 at the time of turning on the basis of the turning radius (R) and the speed of the vehicle 1. Then, the seat control unit 301 gradually controls the balance of the left and right hardness of the seat cushion 211 by the above-described method from before the vehicle 1 starts turning on the basis of the estimated lateral acceleration. For example, in a case where clockwise turning of the vehicle 1 is predicted, the left gluteal contact portion of the seat cushion 211 in the direction opposite to the turning direction is gradually hardened. For example, in a case where counterclockwise turning of the vehicle 1 is predicted, the right gluteal contact portion of the seat cushion 211 in the direction opposite to the turning direction is gradually hardened. As a result, it becomes easy for the driver to maintain the posture while facing the turning of the vehicle 1, and the fatigue level of the driver is reduced.

Note that a method of predicting the turning of the vehicle 1 in the yaw direction is not particularly limited. For example, the recognition unit 73 predicts the turning of the vehicle 1 in the yaw direction by recognizing the situation of the road in front of the vehicle 1 (for example, presence or absence of a curve, and the like) on the basis of the image data obtained by imaging the front of the vehicle 1. For example, the recognition unit 73 predicts turning of the vehicle 1 in the yaw direction on the basis of map information provided from an external server or the like, the current position of the vehicle 1, a route plan created by the action planning unit 62, and the like.

Furthermore, for example, the seat control unit 301 starts processing of controlling the hardness of the seat surface of the seat 201 on the basis of a result of prediction of vibration in the vertical direction of the vehicle 1 in front of the vehicle 1.

For example, in a case where the recognition unit 73 predicts generation of vibration in the vertical direction of the vehicle 1, the seat control unit 301 softens each adjustment portion 222 before the vibration in the vertical direction is generated, and returns the hardness of each adjustment portion 222 to the original hardness after the vibration in the vertical direction ends. Therefore, vibration in the vertical direction applied to the driver is reduced.

Note that a method of predicting the vibration of the vehicle 1 in the vertical direction is not particularly limited. For example, the recognition unit 73 predicts vibration of the vehicle 1 in the vertical direction by recognizing a vibration factor such as a step in advance on the basis of image data obtained by imaging the front of the vehicle 1. For example, the recognition unit 73 predicts vibration of the vehicle 1 in the vertical direction by recognizing a vibration factor in advance on the basis of map information including road surface information (for example, roughness, undulation, and the like of the road surface), a current position of the vehicle 1, a route plan created by the action planning unit 62, and the like provided from an external server or the like.

Furthermore, for example, the seat control unit 301 starts processing of controlling the hardness of the seat surface of the seat 201 in accordance with content (for example, video, music, and the like) reproduced in the vehicle 1.

For example, the seat control unit 301 changes the hardness of each adjustment portion 222 in accordance with the rhythm of the music being reproduced. For example, the seat control unit 301 changes the balance of the hardness of the left and right adjustment portions 222 on the basis of the difference between the sounds output from the left and right speakers.

Therefore, it improves the content experience of the driver.

Moreover, for example, the seat control unit 301 starts processing of adjusting the vertical position of the line-of-sight of the driver in accordance with a change in hardness of the seat surface (each adjustment portion 222) of the seat 201.

Specifically, when the hardness of at least one of the adjustment portions 222 changes, the position of the gluteal portion of the driver moves in the vertical direction, and thus the position of the line-of-sight of the driver also moves in the vertical direction. In order to suppress the variation in the vertical position of the line-of-sight of the driver, the seat control unit 301 controls, for example, a drive unit (not illustrated) to move the entire seat 201 in the vertical direction so as to offset the variation in the vertical position of the line-of-sight of the driver.

For example, the seat control unit 301 moves the entire seat 201 in the vertical direction on the basis of the vertical position of the line-of-sight (or head) of the driver detected by the DMS 30.

For example, the seat control unit 301 estimates the change amount of the vertical position of the line-of-sight of the driver on the basis of the change amount in the load to each adjustment portion 222 detected by the sensor data from the sensor unit 323 of the seat 201 in the driver's seat.

Then, the seat control unit 301 moves the entire seat 201 in the vertical direction so as to offset the estimated change amount.

Note that, in this case, for example, the relationship between the amount of change in the load applied to each adjustment portion 222 and the amount of change in the vertical position of the line-of-sight of the driver is evaluated in advance, and data indicating the relationship between them is stored in the recording unit 28 in advance. Then, the seat control unit 301 estimates the amount of change in the vertical position of the line-of-sight of the driver on the basis of this data.

Therefore, the vertical position of the line-of-sight of the driver is stabilized regardless of the change in the hardness of the seat surface of the seat 201, and the comfort is improved.

Note that, for example, the vertical position of the line-of-sight of the driver may be adjusted in a case where the hardness of at least one of the adjustment portions 222 changes, or the vertical position of the line-of-sight of the driver may be adjusted only in a case where the hardness of both the adjustment portions 222 changes.

Furthermore, for example, on/off of the adjustment function of the vertical position of the line-of-sight of the driver may be switched.

In step S4, the DMS 30 determines whether or not drowsiness of the driver is detected. In a case where it is determined that the drowsiness of the driver is detected, the processing proceeds to step S5.

Note that a method for detecting the drowsiness of the driver is not particularly limited.

For example, the DMS 30 detects the drowsiness of the driver on the basis of an image of the driver.

In step S5, the seat control unit 301 controls the hardness of the seat 201 so as to give a stimulus to the driver.

Specifically, the DMS 30 notifies the seat control unit 301 of detection of the drowsiness of the driver.

For example, the seat control unit 301 controls the drive unit 322 to alternately change the hardness of the adjustment portion 222L and the adjustment portion 222R largely. Therefore, an unnatural stimulus is alternately applied to the left gluteal portion and the right gluteal portion of the driver, the body of the driver is shaken left and right, and an effect of awakening the driver's drowsiness is obtained.

Thereafter, the processing proceeds to step S6.

On the other hand, in a case where it is determined that the drowsiness of the driver is not detected in step S4, processing in step S5 is skipped, and the processing proceeds to step S6.

In step S6, the DMS 30 determines whether or not the fatigue of the driver is detected. In a case where it is determined that the fatigue of the driver is detected, the processing proceeds to step S7.

Note that a method for detecting the fatigue of the driver is not particularly limited.

For example, the DMS 30 detects the fatigue of the driver on the basis of an image captured of the driver.

In step S7, the seat control unit 301 controls the hardness of the seat 201 so as to reduce the fatigue of the driver.

Specifically, the DMS 30 notifies the seat control unit 301 of detection of the fatigue of the driver.

For example, the seat control unit 301 controls the drive unit 322 to adjust the hardness of each adjustment portion 222 so that the seat cushion 211 has hardness that reduces the fatigue of the driver. Furthermore, for example, the seat control unit 301 controls the drive unit 322 to alternately change the hardness of the adjustment portion 222L and the adjustment portion 222R in a rhythmic manner, thereby giving a massage effect to the driver.

Thereafter, the processing proceeds to step S8.

On the other hand, in a case where it is determined that the fatigue of the driver is not detected in step S6, processing in step S7 is skipped, and the processing proceeds to step S8.

In step S8, the DMS 30 determines whether or not the posture of the driver is bad. In a case where it is determined that the fatigue of the driver is bad, the processing proceeds to step S9.

Note that a method for determining the posture of the driver is not particularly limited.

For example, DMS 30 determines whether or not the posture of the driver is bad on the basis of the image obtained by imaging the driver.

For example, the DMS 30 detects a difference in load to the left gluteal contact portion and the right gluteal contact portion of the seat cushion 211 on the basis of the sensor data indicating a load to each adjustment portion 222 supplied from the sensor unit 323. This difference corresponds to a deviation of a barycentric position of the driver. In a case where the difference between the detected loads is equal to or larger than a predetermined threshold value, the DMS 30 determines that the posture of the driver is bad (the balance between the left and right of the body of the driver is bad).

In step S9, the seat control unit 301 controls the hardness of the seat 201 so as to improve the posture of the driver.

Specifically, the DMS 30 notifies the seat control unit 301 of the bad posture of the driver.

For example, the seat control unit 301 controls the drive unit 322 to adjust the hardness of each adjustment portion 222 so as to improve the posture of the driver. For example, the seat control unit 301 controls the drive unit 322 to adjust the hardness of the adjustment portion 222L and the adjustment portion 222R such that loads on the left gluteal contact portion and the right gluteal contact portion of the seat cushion 211 become substantially equal.

Therefore, the center of gravity of the driver moves to an ideal position, and as a result, the posture of the driver is improved, and the fatigue of the driver is reduced.

Thereafter, the processing proceeds to step S10.

On the other hand, in a case where it is determined in step S8 that the posture of the driver is not bad, the processing of step S9 is skipped, and the processing proceeds to step S10.

In step S10, the DMS 30 or the vehicle control unit 32 determines whether or not the driver leaves the seat. In a case where it is determined that the driver leaves the seat, the processing proceeds to step S11.

Note that a method for determining whether or not the driver leaves the seat is not particularly limited.

For example, the DMS 30 determines whether or not the driver leaves the driver's seat on the basis of image data for imaging the direction of the driver's seat.

For example, in a case where the power of the vehicle 1 is turned off, when the door of the driver's seat of the vehicle 1 is unlocked, or when the door of the driver's seat of the vehicle 1 is opened in a case where the driver is seated in the driver's seat, the body system control unit 84 of the vehicle control unit 32 determines that the driver leaves the seat.

In step S11, the seat control unit 301 gradually hardens the seat 201. Specifically, the seat control unit 301 controls the drive unit 322 to gradually change each of the adjustment portions 222 to the hardest state. Therefore, the seat cushion 211 is gradually hardened, and the force for raising the upper body when the driver gets off the vehicle 1 is supported.

Note that when the driver leaves the seat, for example, in a case where the entire seat 201 moves upward and the seat surface (the seat cushion 211) of the seat 201 moves upward, each adjustment portion 222 may be hardened in accordance with the upward movement of the seat surface of the seat 201.

In step S12, the seat control unit 301 stops the control of the hardness of the seat according to the state of the vehicle 1 and the inside and outside of the vehicle.

Thereafter, the processing returns to step S1, and the processing in and after step S1 is executed.

On the other hand, in a case where it is determined in step S10 that the driver does not leave the seat, the processing returns to step S4, and the processing of steps S4 to S10 is repeatedly executed until it is determined in step S10 that the driver leaves the seat.

Note that during the above processing described above, for example, the driver can input an instruction using the HMI 31 to adjust the hardness of each adjustment portion 222.

Furthermore, in the above description, the example in which the hardness of the seat 201 of the driver's seat is controlled has been described, but the hardness of the other seats 201 of the vehicle 1 can also be controlled by similar processing.

As described above, with the simple configuration in which only the hardness of two places of the left gluteal portion contact and the right gluteal contact portion of the seat 201 is controlled, the hardness of the seat surface of the seat 201 can be appropriately adjusted on the basis of the state of the user, the state of the vehicle 1, and the situation inside and outside the vehicle, and the comfort of the user is improved.

Furthermore, the number of parts is suppressed, and the configuration and the manufacturing process are simplified. As a result, the cost of the seat 201 can be suppressed, and the process of controlling the hardness of the seat surface of the seat 201 becomes simple.

3. MODIFICATION EXAMPLE

Hereinafter, a modification example of the above-described embodiments of the present technology will be described.

FIG. 8 illustrates an example in which the drive unit 322 is provided on the seat 201, but for example, the drive unit may be provided outside the seat 201. Furthermore, for example, the seat control unit 301 may be provided on the seat 201. In this case, for example, the seat control unit 301 and the communication unit 321 may be integrated.

Moreover, for example, the seat control unit 301 can be provided in a server or the like outside the vehicle 1. Specifically, for example, various sensor data and the like can be transmitted to the outside, and the hardness of the seat 201 can be controlled from the outside.

For example, the sensor unit 323 of each adjustment portion 222 can be provided with a pressure gauge instead of the load meter.

For example, instead of the air adjusted lumbar 251 in FIG. 6, that is, instead of the bag-shaped member for filling gas, for example, a bag-shaped member for filling liquid such as water can be used.

For example, it is possible to evaluate a change in the weight of the user on the basis of sensor data indicating a load to each adjustment portion 222 supplied from the sensor unit 323.

Furthermore, the present technology can also be applied to, for example, a seat of a moving device other than the above-described vehicle, particularly, a moving device in which a seat is individually provided for each user, and processing of controlling hardness of the seat. Examples of the moving device to which the present technology can be applied include personal mobility, airplanes, helicopters, trains, ships, construction machines, agricultural machines (tractors), and the like.

4. OTHER

Configuration Example of Computer

The above-described series of processing can be executed by hardware or software. In a case where the series of processing is executed by software, a program constituting the software is installed in a computer. Here, the computer includes a computer incorporated in dedicated hardware, a general-purpose personal computer capable of executing various functions by installing various programs, and the like, for example.

Figure 10:
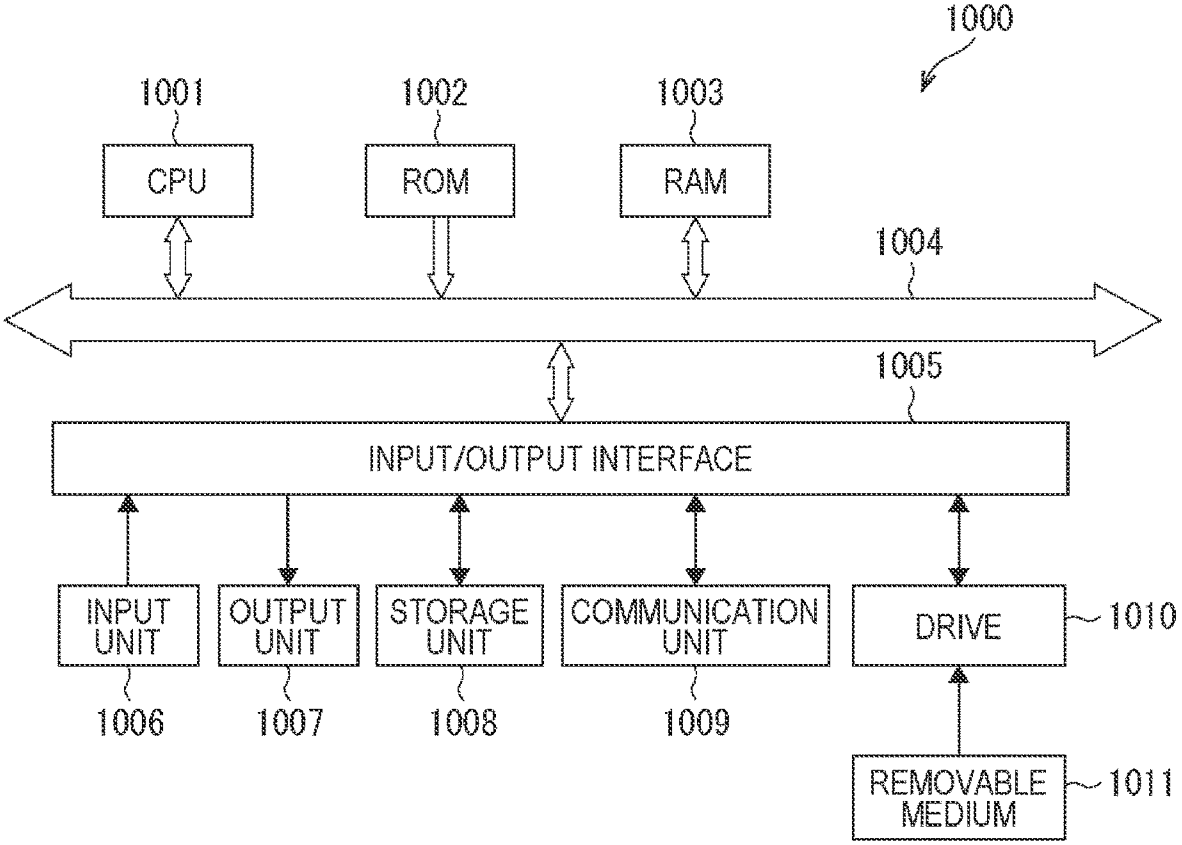
FIG. 10 is a block diagram illustrating a configuration example of a computer.

FIG. 10 is a block diagram illustrating a configuration example of hardware of a computer that executes the above-described series of processing by a program.

In a computer 1000, a central processing unit (CPU) 1001, a read only memory (ROM) 1002, and a random access memory (RAM) 1003 are mutually connected by a bus 1004.

An input/output interface 1005 is further connected to the bus 1004. An input unit 1006, an output unit 1007, a recording unit 1008, a communication unit 1009, and a drive 1010 are connected to the input/output interface 1005.

The input unit 1006 includes an input switch, a button, a microphone, an imaging element, and the like. The output unit 1007 includes a display, a speaker, and the like. The recording unit 1008 includes a hard disk, a nonvolatile memory, and the like. The communication unit 1009 includes a network interface and the like. The drive 1010 drives a removable medium 1011 such as a magnetic disk, an optical disc, a magneto-optical disk, or a semiconductor memory.

In the computer 1000 configured as described above, for example, the CPU 1001 loads a program recorded in the recording unit 1008 into the RAM 1003 via the input/output interface 1005 and the bus 1004 and executes the program, whereby the above-described series of processing is performed.

The program executed by the computer 1000 (the CPU 1001) can be provided by being recorded in the removable medium 1011 as a package medium or the like, for example. Furthermore, the program can be provided via a wired or wireless transmission medium such as a local area network, the Internet, or digital satellite broadcasting.

In the computer 1000, the program can be installed in the recording unit 1008 via the input/output interface 1005 by attaching the removable medium 1011 to the drive 1010. Furthermore, the program can be received by the communication unit 1009 via a wired or wireless transmission medium and installed in the recording unit 1008. In addition, the program can be installed in the ROM 1002 or the recording unit 1008 in advance.

Note that the program executed by the computer may be a program in which processing is performed in time series in the order described in the present specification, or may be a program in which processing is performed in parallel or at necessary timing such as when a call is made.

Furthermore, in the present specification, a system means a set of a plurality of configuration elements (devices, modules (parts), and the like), and it does not matter whether or not all the components are in the same housing. Therefore, a plurality of devices housed in separate housings and connected via a network and one device in which a plurality of modules is housed in one housing are both systems.

Moreover, the embodiments of the present technology are not limited to the above-described embodiments, and various modification examples can be made without departing from the gist of the present technology.

For example, the present technology can have a configuration of cloud computing in which one function is shared and processed in cooperation by a plurality of devices via a network.

Furthermore, each step described in the above-described flowchart can be executed by one device or can be shared and executed by a plurality of devices.

Moreover, in a case where a plurality of processes is included in one step, the plurality of processing operations included in the one step can be executed by one device or can be shared and executed by a plurality of devices.

Combination Example of Configuration

The present technology can also have the following configurations.

(1)

A seat for a moving device including:

a first adjustment portion configured to adjust hardness of a left gluteal contact portion including a portion assumed to be in contact with a left gluteal portion of a user on a seat surface; and a second adjustment portion configured to adjust hardness of a right gluteal contact portion including a portion assumed to be in contact with a right gluteal portion of the user on the seat surface.

(2)

The seat for a moving device according to above (1), further including:

an elastic member configured to support a gluteal portion of the user; and a support member configured to support the elastic member below the elastic member and suppress downward deformation of the elastic member, in which the first adjustment portion is provided between the elastic member and the support member below the left gluteal contact portion, and the second adjustment portion is provided between the elastic member and the support member below the right gluteal contact portion.

(3)

The seat for a moving device according to above (2), in which the first adjustment portion includes a first bag-shaped member of which hardness can be adjusted by a filling amount of a gas or liquid and a first plate-shaped member fixed to an upper surface of the first bag-shaped member below the left gluteal contact portion, and the second adjustment portion includes a second bag-shaped member of which hardness can be adjusted by a filling amount of a gas or liquid and a second plate-shaped member fixed to an upper surface of the second bag-shaped member below the right gluteal contact portion.

(4)

The seat for a moving device according to above (2), in which the first adjustment portion includes a first sheet-like member that extends substantially horizontally in a planar shape below the left gluteal contact portion and has flexibility, and a first adjustment mechanism that adjusts force of pulling the first sheet-like member in a plane direction, and the second adjustment portion includes a second sheet-like member that extends substantially horizontally in a planar shape below the right gluteal contact portion and has flexibility, and a second adjustment mechanism that adjusts force of pulling the second sheet-like member in a plane direction.

(5)

The seat for a moving device according to any one of above (1) to (4), further including:

a drive unit that individually drives the first adjustment portion and the second adjustment portion and individually adjusts hardness of the first adjustment portion and the second adjustment portion.

(6)

The seat for a moving device according to above (5), further including:

a communication unit configured to receive a control signal from the outside, in which the drive unit drives the first adjustment portion and the second adjustment portion according to the control signal.

(7)

The seat for a moving device according to above (5), further including:

a seat control unit configured to individually control the hardness of the first adjustment portion and the second adjustment portion by controlling the drive unit.

(8)

The seat for a moving device according to any one of above (1) to (7), in which the hardness of only the left gluteal contact portion and the right gluteal contact portion in the seat surface is adjustable.

(9)

A seat control device including:

a seat control unit configured to individually control hardness of a left gluteal contact portion including a portion assumed to be in contact with a left gluteal portion of a user and hardness of a right gluteal contact portion including a portion assumed to be in contact with a right gluteal portion of the user on a seat surface of a seat for a moving device on the basis of at least one of a state of the user, a state of the moving device, a situation in the moving device, and a situation outside the moving device.

(10)

The seat control device according to above (9), in which the seat control unit hardens a gluteal contact portion in a direction opposite to a direction of lateral acceleration applied to the moving device among the left gluteal contact portion and the right gluteal contact portion.

(11)

The seat control device according to above (9) or (10), in which, in a case where turning of the moving device in a yaw direction is predicted, the seat control unit hardens a gluteal contact portion in a direction opposite to a direction in which the moving device turns, among the left gluteal contact portion and the right gluteal contact portion.

(12)

The seat control device according to any one of above (9) to (11), in which, in a case where vibration of the moving device in the vertical direction is predicted, the seat control unit softens the left gluteal contact portion and the right gluteal contact portion.

(13)

The seat control device according to any one of above (9) to (12), in which the seat control unit controls the hardness of the left gluteal contact portion and the right gluteal contact portion on the basis of a driving mode of the moving device.

(14)

The seat control device according to above (13), in which the seat control unit softens the left gluteal contact portion and the right gluteal contact portion during automatic driving of the moving device.

(15)

The seat control device according to any one of above (9) to (14), in which the seat control unit changes the hardness of the left gluteal contact portion and the right gluteal contact portion in a case where drowsiness or fatigue of the user is detected.

(16)

The seat control device according to any one of above (9) to (15), in which the seat control unit controls a balance of the hardness between the left gluteal contact portion and the right gluteal contact portion on the basis of a posture of the user.

(17)

The seat control device according to any one of above (9) to (16), in which the seat control unit gradually softens the left gluteal contact portion and the right gluteal contact portion after the user is seated, and gradually hardens the left gluteal contact portion and the right gluteal contact portion before the user leaves the seat.

(18)

The seat control device according to any one of above (9) to (17), in which the seat control unit changes the hardness of the left gluteal contact portion and the right gluteal contact portion in accordance with content reproduced in the moving device.

(19)

The seat control device according to any one of above (9) to (18), in which the seat control unit controls a drive unit that individually drives a first adjustment portion that adjusts the hardness of the left gluteal contact portion and a second adjustment portion that adjusts the hardness of the right gluteal contact portion.

(20)

A seat control method including:

individually controlling hardness of a left gluteal contact portion including a portion assumed to be in contact with a left gluteal portion of a user and hardness of a right gluteal contact portion including a portion assumed to be in contact with a right gluteal portion of the user on a seat surface of a seat for a moving device on the basis of at least one of a state of the user, a state of the moving device, a situation in the moving device, and a situation outside the moving device.

Note that the effects described in the present specification are merely examples and are not limited, and other effects may be provided.

REFERENCE SIGNS LIST

1 Vehicle
11 Vehicle control system
30 DMS
31 HMI
62 Action planning unit
63 Operation control unit
71 Self-position estimation unit
73 Recognition unit
84 Body system control unit
201 Seat
211 Seat cushion
221 Frame
222L, 222R Adjustment portion
231 Support member
232 Pad
233 Skin
251L, 251R Air adjusted lumbar
252L, 252R Plate
271L, 271R Band
272L, 272R Fixing member
273L, 273R Winding member
301 Seat control unit
321 Communication unit
322 Drive unit
323 Sensor unit

The invention claimed is:

1. A seat for a moving device, the seat comprising:

a first adjustment portion configured to adjust hardness of a left gluteal contact portion of the seat, wherein the left gluteal contact portion is associated with a left gluteal portion of a user;

a second adjustment portion configured to adjust hardness of a right gluteal contact portion of the seat, wherein the right gluteal contact portion is associated with a right gluteal portion of the user, and at least one of hardness of the first adjustment portion or hardness of the second adjustment portion is adjusted based on a prediction of a vertical vibration in the moving device; and a drive unit configured to;

further adjust the at least one of the hardness of the first adjustment portion or the hardness of the second adjustment portion, based on a state of the moving device, a situation inside the moving device, and a situation outside the moving device, wherein the situation inside the moving device includes one of temperature, humidity, brightness, or odor inside the moving device, and the situation outside the moving device indicates a self-position of the moving device and an occupancy state of an object in a vicinity of the moving device;

soften the first adjustment portion and the second adjustment portion before a generation of the vertical vibration; and return the hardness of the first adjustment portion and the hardness of the second adjustment portion after the vertical vibration ends.

2. The seat for the moving device according to claim 1, further comprising:

an elastic member configured to support the left gluteal portion and the right gluteal portion; and a support member below the elastic member, wherein the support member is configured to:

support the elastic member; and suppress downward deformation of the elastic member,
the first adjustment portion is between a first portion of the elastic member and the support member,
the first portion of the elastic member is below the left gluteal contact portion,
the second adjustment portion is between a second portion of the elastic member and the support member, and
the second portion of the elastic member is below the right gluteal contact portion.

3. The seat for the moving device according to claim 2, wherein
the first adjustment portion includes
a first bag-shaped member, wherein hardness of the first bag-shaped member is based on an amount of one of a gas or a liquid in the first bag-shaped member;
a first plate-shaped member fixed to an upper surface of the first bag-shaped member; and
the first plate-shaped member is below the left gluteal contact portion, and
the second adjustment portion includes
a second bag-shaped member, wherein hardness of the second bag-shaped member is based on an amount of one of a gas or a liquid in the second bag-shaped member;
a second plate-shaped member fixed to an upper surface of the second bag-shaped member; and
the second plate-shaped member is below the right gluteal contact portion.

4. The seat for the moving device according to claim 1, wherein the drive unit is further configured to individually drive at least one of the first adjustment portion or the second adjustment portion to adjust at least one of the hardness of the first adjustment portion or the hardness of the second adjustment portion.

5. The seat for the moving device according to claim 4, further comprising a communication unit configured to receive a control signal, wherein
the drive unit is further configured to drive at least one of the first adjustment portion or the second adjustment portion based on the control signal.

6. The seat for the moving device according to claim 4, further comprising a seat control unit configured to:
control the drive unit; and
control at least one of the hardness of the first adjustment portion or the hardness of the second adjustment portion based on the control of the drive unit.

7. The seat for the moving device according to claim 1, wherein one of the hardness of the left gluteal contact portion or the hardness of the right gluteal contact portion is adjustable.

8. A seat control device, comprising:
a seat control unit configured to:
control at least one of hardness of a left gluteal contact portion of a seat of a moving device or hardness of a right gluteal contact portion of the seat, based on a state of the moving device, a situation inside the moving device, and a situation outside the moving device, wherein
the situation inside the moving device includes one of temperature, humidity, brightness, or odor inside the moving device,
the situation outside the moving device indicates a self-position of the moving device and an occupancy state of an object in a vicinity of the moving device,
the left gluteal contact portion is associated with a left gluteal portion of a user, and
the right gluteal contact portion is associated with a right gluteal portion of the user; and
control softness of the left gluteal contact portion and softness of the right gluteal contact portion based on a prediction of a vertical vibration of the moving device, wherein
the left gluteal contact portion and the right gluteal contact portion are softened before a generation of the vertical vibration, and
the hardness of the left gluteal contact portion and the hardness of the right gluteal contact portion returns after the vertical vibration ends.

9. The seat control device according to claim 8, wherein the seat control unit is further configured to control one of the hardness of the left gluteal contact portion or the hardness of the right gluteal contact portion based on a direction of a lateral acceleration associated with the moving device.

10. The seat control device according to claim 8, wherein, based on a prediction that the moving device turns in a yaw direction, the seat control unit is further configured to one of:
control the hardness of the left gluteal contact portion based on the moving device that turns in a first yaw direction; or
control the hardness of the right gluteal contact portion based on the moving device that turns in a second yaw direction.

11. The seat control device according to claim 8, wherein the seat control unit is further configured to control the hardness of the left gluteal contact portion and the hardness of the right gluteal contact portion based on a driving mode of the moving device.

12. The seat control device according to claim 11, wherein the seat control unit is further configured to control the softness of the left gluteal contact portion and the softness of the right gluteal contact portion based on an automatic driving mode of the moving device.

13. The seat control device according to claim 8, wherein the seat control unit is further configured to change at least one of the hardness of the left gluteal contact portion or the hardness of the right gluteal contact portion, based on one of drowsiness of the user or fatigue of the user.

14. The seat control device according to claim 8, wherein the seat control unit is further configured to control the hardness of the left gluteal contact portion and the hardness of the right gluteal contact portion based on a posture of the user.

15. The seat control device according to claim 8, wherein the seat control unit is further configured to:
control the softness of the left gluteal contact portion and the softness of the right gluteal contact portion after the user is seated; and
control the hardness of the left gluteal contact portion and the hardness of the right gluteal contact portion before the user leaves the seat.

16. The seat control device according to claim 8, wherein the seat control unit is further configured to change the hardness of the left gluteal contact portion and the hardness of the right gluteal contact portion based on content associated with the moving device.

17. The seat control device according to claim 8, wherein
the seat control unit is further configured to control a drive unit of the seat,
the drive unit individually drives at least one of a first adjustment portion or a second adjustment portion, the first adjustment portion adjusts the hardness of the left gluteal contact portion, and the second adjustment portion adjusts the hardness of the right gluteal contact portion.

18. A seat control method, comprising:

controlling hardness of a left gluteal contact portion of a seat of a moving device and hardness of a right gluteal contact portion of the seat based on a state of the moving device, a situation inside the moving device, and a situation outside the moving device, wherein the situation inside the moving device includes one of temperature, humidity, brightness, or odor inside the moving device, the situation outside the moving device indicates a self-position of the moving device and an occupancy state of an object in a vicinity of the moving device, the left gluteal contact portion corresponds to a left gluteal portion of a user, and the right gluteal contact portion corresponds to a right gluteal portion of the user; and controlling softness of the left gluteal contact portion and softness of the right gluteal contact portion based on a prediction of a vertical vibration of the moving device, wherein the left gluteal contact portion and the right gluteal contact portion are softened before a generation of the vertical vibration, and the hardness of the left gluteal contact portion and the hardness of the right gluteal contact portion returns after the vertical vibration ends.

* * * * *